Patented Mar. 7, 1950

2,500,113

UNITED STATES PATENT OFFICE 2,500,113

MOLDABLE CONDENSATION PRODUCTS OF SILVERED FORMALDEHYDE

Reginald M. Banks, New York, N. Y., and Robert B. Barnes, Stamford, Conn., assignors to American Cyanamid Company, New York, N. Y., a corporation of Maine No Drawing. Application March 21, 1947, Serial No. 736,430

2 Claims. (Cl. 260—67.6)

1

This invention relates to molded objects which are aseptic and exhibit germicidal action when placed in contact with a fluid medium, and to the molding compositions from which such objects are made.

It is difficult to keep drinking utensils aseptic unless they are thoroughly washed with a germicidal solution, steam sterilized or subjected to some other method of sterilization such as ultraviolet radiation after each usage.

Many other molded objects, such as those employed in medicine and surgery, must be sterilized prior to each usage. Sterilization of such articles is often omitted by patients administering self-medication, thereby endangering their health. Furthermore, in war time sterilization in the field may be difficult or at times impossible.

It is an object of this invention to provide molded articles which maintain themselves in a substantially aseptic condition. More specifically, this object of our invention includes the provision of molded receptacles having aseptic characteristics which are suitable for the storing or dispensing of beverages.

It is another object of our invention to provide molded or extruded articles which may be used to completely remove or materially reduce the number of bacteria present in water.

Another object of our invention is to provide molded articles containing silver in an extremely active form.

The above and other objects have been partly accomplished by various means. For example, according to the copending application of Garnet P. Ham and Robert B. Barnes, Serial No. 461,902 filed October 13, 1942, now U. S. Patent No. 2,434,190, dated January 6, 1948, molded articles which maintain themselves in a substantially aseptic condition and/or which may be used to completely remove or materially reduce the number of bacterial organisms in water or other liquid contained in the molded article are produced by pressure and heat treatment of a molding composition comprising a moldable resin and an anion active resin having silver precipitated thereon and bound therewith.

Furthermore, the production of germicidal molded articles by placing a molded article in contact with water containing silver under conditions allowing absorption of the silver by the molded article has also been proposed. The silvered water used in such a process may be obtained, for instance, by contacting a quantity of water with a silvered ion exchange resin such

2 as described and claimed in the copending application of Robert B. Barnes and Garnet P. Ham, Serial No. 461,900, filed October 13, 1942, or by means of a silver electrode system. In either case, the molded article absorbs ionic silver from the water. It is advantageous, when such methods of causing silver to be absorbed by molded articles are used, to pretreat the surfaces of the articles which are to be silvered, as, for instance, with a weak alkaline solution or by other means, in order to remove at least part of the surface gloss produced during the molding operation in order to promote absorption of the silver by the molded article.

According to the present invention the above and other objects are accomplished more effectively and more efficiently by incorporating the germicidal silver directly into a molding composition prior to its actual molding. More particularly, formaldehyde containing silver, preferably obtained by contact of the formaldehyde with a silvered ion exchange resin, is condensed with an amino compound such as urea, melamine, etc., phenol or other similar material capable of forming with formaldehyde a moldable thermosetting condensation product. The resulting condensation product may then be shaped or molded into any desired form.

The invention will be described in greater detail in conjunction with the following specific examples in which proportions are given in parts by weight. It should be understood that the details set forth are given by way of illustration and not in limitation.

EXAMPLE 1

500 parts of silver-treated anion exchange resin A, prepared as described below, and 5400 parts of a 37% aqueous formaldehyde solution are slurried together for 36 hours and then filtered.

3140 parts of the so-prepared silvered formalin and 1600 parts of melamine are slurried together. The pH of the slurry is adjusted by means of formic acid and sodium hydroxide to about 7.0, and the slurry is heated to about 70° C. This reaction mixture is held at about 70° C. until it becomes clear, whereupon it is cooled to about 60° C. and adjusted to a pH of about 9.3 by the addition of sodium hydroxide.

1790 parts of the methylol melamine syrup, prepared as just described, are intimately mixed with 487 parts of alpha-pulp for about one-half hour and the mixture then dried at 138° F. for 2 hours. 2530 parts of the mixture of melamine resin and alpha-pulp, 8.8 parts of a mixture of toluene sulfonamide and phthalic anhydride as a curing agent, 4.4 parts of hexamethylenetetramine, 11.5 parts of lithopone, and 12.6 parts of zinc stearate are blended together on a ball mill and ordinary drinking tumblers are molded therefrom at a temperature of about 150° C. and a pressure of about 1500–2000 p. s. i.

A tumbler so produced from a thermosetting condensation product of silvered formaldehyde according to the present invention shows a gross silver component of 5 p. p. m. Water placed in the tumbler shows a silver component of 0.04 p. p m. after 5 minutes when the inner surface of the tumbler has been treated to remove the surface gloss, thus facilitating the transfer of active silver ions.

A small piece of a tumbler prepared according to the process of the present invention, when completely submerged in HLD non-pathogenic tuberculosis broth, inhibits growth of the organisms. Complete bacteriostatic action lasts up to 5 days and further plating shows that no growth occurs after an additional 5 days.

*Preparation of silver-treated anion exchange resin "A"*

A column about ¾ inch in diameter and having a volume of about 100 cc. is packed with anion resin "A" prepared according to Swain U. S. Patent No. 2,285,750. The resin is activated by treatment with a dilute solution of an alkaline material, e. g., a 2% solution of sodium carbonate in water, and the resin is washed with water until the pH of the effluent is between about 9 and 11. The column is shielded from light to prevent photo-reduction of the silver during the succeeding treatment. A dilute solution of silver nitrate (for example 0.1 M) is passed through the column until the resin has taken up all the silver it can, as evidenced by its failure to remove any more, i. e., the silver contents of influent and effluent are the same. About 450 cc. of 0.1 M silver nitrate solution is required. Any excess of solution is removed from the treated resin by vacuum drying and the resin is then washed with water. The resin may be used in this form or it may be dried by any suitable means such as by subjecting it to a vacuum. The silvered resin is dark brown to black in color.

EXAMPLE 2

Aqueous formaldehyde is treated with a silver-treated cation exchange resin "C" prepared as described below and the silvered formaldehyde obtained utilized in the preparation of molding compositioins, all in accordance with the procedure of Example 1.

*Preparation of silver-treated cation exchange resin "C"*

120 parts of wet activated cation resin prepared as described in Example 5 of U. S. Patent No. 2,372,233 are placed in a container provided with means for agitation and 3.4 parts of silver nitrate as a 0.04 N aqueous solution are added. After 1 minute of slurrying, the resin has taken up 0.003 part Ag per part of resin; after 30 minutes, 0.021 part Ag per part of resin.

In place of part or all of anion exchange resin "A," other anion active materials may be substituted. Among these are included: condensation products of acetaldehyde, formaldehyde and polyalkylene polyamine (copending application of Jack T. Thurston, Serial No. 643,836 filed January 26, 1946 and now abandoned); condensation products of acrylonitrile-ammonocarbonic acid adducts and polyamines (copending application of James R. Dudley, Serial No. 651,375 filed March 1, 1946 now Patent Number 2,473,498 June 21, 1949); condensation products of aminotriazine, aldehyde and guanido compounds (copending application of James R. Dudley, Serial No. 607,277 filed July 26, 1945 and now abandoned); condensation products of aminotriazine, aldehyde and strongly-basic non-aromatic amine (copending application of James R. Dudley, Serial No. 649,127 filed February 20, 1946); condensation products of biguanide, aldehyde and urea- or melamine-aldehyde condensation products as described in Swain U. S. Patent No. 2,251,234; biguanide-carbonyl and aldehyde condensation products (copending application of Donald W. Kaiser, Serial No. 703,481 filed October 16, 1946); crotonaldehyde, formaldehyde and polyalkylene polyamine condensation products (copending application of James R. Dudley, Serial No. 643,838 filed January 26, 1946 and now abandoned); epichlorhydrin and alkylene polyamine condensation products (copending application of James R. Dudley and Lennart A. Lundberg, Serial No. 616,644 filed September 15, 1945 now Patent Number 2,469,683 May 10, 1949); polyepoxy and alkylene polyamine condensation products (copending application of James R. Dudley, Serial No. 655,005 filed March 16, 1946 now Patent Number 2,469,684 May 10, 1949); furfural and guanido-carbonyl condensation products (copending application of James R. Dudley, Serial No. 703,489 filed October 16, 1946); furyl aliphatic amine and aldehyde condensation products (copending application of James R. Dudley, Serial No. 642,416 filed January 19, 1946); glycerol dichlorhydrin and alkylene polyamine condensation products (copending application of Lennart A. Lundberg, Serial No. 624,606 filed October 25, 1946 now Patent Number 2,469,693 May 10, 1949); guanido-aldehyde, urea, etc., aldehyde condensation products (copending application of James R. Dudley and Wilbur N. Oldham, Serial No. 703,488 filed October 16, 1946); guanido-ketone, urea, etc., aldehyde condensation products (James R. Dudley, Serial No. 703,487 filed October 16, 1946); guanyl urea, aldehyde, urea, etc., aldehyde condensation products (copending application of Robert C. Swain, Serial No. 368,105 filed November 30, 1940 and now abandoned); phenyl biguanide, aldehyde, urea, etc., aldehyde condensation products (copending application of Robert C. Swain, Serial No. 443,939 filed May 21, 1942 and now abandoned); polyacrylic acid and polyamine condensation products (copending application of James R. Dudley, Serial No. 648,818 filed February 19, 1946); polyamine-aldehyde, urea-formaldehyde condensation products (copending application of James R. Dudley, Serial No. 442,281 filed May 8, 1942 and now abandoned); polyamine - aldehyde, aminotriazine - formaldehyde condensation products (copending applications of James R. Dudley, Serial No. 442,282 filed May 8, 1942 and now abandoned and 633,859 filed December 8, 1945); bifunctional triazine and polyalkylene polyamine condensation products (copending application of James R. Dudley, Serial No. 638,462 filed December 29, 1945 now Patent Number 2,467,523 April 19, 1949); phenol, formaldehyde, and tetraethylenepentamine condensation products as described in U. S. Patents Nos. 2,402,384 and 2,341,907.

In place of part or all of cation exchange resin "C" of Example 2 there may be used the furfural-mineral acid halide condensation products of U. S. Patent No. 2,408,615; condensation products of bisphenol, a sulfite and formaldehyde (copending application of Harold M. Day and Ronald L. De Hoff, Serial No. 676,096 filed June 11, 1946); of bisphenol sulfone, a sulfite and formaldehyde (copending application of Harold M. Day, Serial No. 694,817 filed September 4, 1946 now Patent Number 2,497,054 February 7, 1950) and of an aldehyde and a sulfonated hydroxyaromatic compound containing a ketone group (copending application of Jack, T. Thurston, Serial No. 541,480 filed June 21, 1944 now Patent Number 2,440,669 April 27, 1948); and sulfonated or phosphonated resinified furfural (copending application of Jack T. Thurston, Serial No. 652,235 filed March 5, 1946).

Other cation exchange resins which may be utilized for the preparation of silvered formaldehyde according to the process of the present invention include nuclear sulfonated phenol-aldehyde reaction products as described in Wassenegger U. S. Patent No. 2,204,539, Findlay U. S. Patent No. 2,230,641 and McFarland U. S. Patent No. 2,361,754; omega-sulfonated phenol-formaldehyde reaction products as described in Wassenegger U. S. Patent No. 2,228,159; condensation products of polyhydric phenols and aldehydes, see Adams and Holmes Patent No. 2,104,501; sulfonated carbonaceous materials as described in Swit U. S. Patents No. 2,191,063 and No. 2,205,635 and in Liebknecht U. S. Patents No. 2,191,060 and No. 2,206,007, etc.

Silvered formaldehyde prepared according to the process of the present invention may be used in the preparation of moldable thermosetting condensation products of phenol, urea, thiourea, aminotriazine, especially melamine, guanamines, dicyandiamide, etc.

Molded articles of the present invention are useful in completely removing or materially decreasing the number of bacteria in a wide variety of fluids. For example, the army has for many years been in search of a solution to the drinking water problem of soldiers in the field where water may be polluted with bacteria not only by natural causes but also by action of the enemy.

The molding compositions of the present invention may be molded or extruded into tablets, blocks, rods, etc. or into various vessels such as tumblers, pitchers and the like. Such molded vessels remove or materially reduce the sensible count of bacteria in fluids which remain in the vessels for even a short period of time.

We claim:

1. A process of preparing a molding composition which comprises contacting aqueous formaldehyde with a silvered ion exchange resin until said formaldehyde contains silver which is in a germicidally active state and condensing the silvered aqueous formaldehyde obtained with a compound capable of forming therewith a moldable thermosetting condensation product and selected from the group consisting of amino compounds, amido compounds and phenol.

2. A process according to claim 1 in which the compound with which the silvered aqueous formaldehyde is condensed is melamine.

REGINALD M. BANKS.
ROBERT B. BARNES.

REFERENCES CITED

The following references are of record in the file of this patent:

UNITED STATES PATENTS

| Number | Name | Date |
|---|---|---|
| 2,434,190 | Barnes and Ham | Jan. 6, 1948 |